(12) United States Patent
Oki et al.

(10) Patent No.: US 7,374,347 B1
(45) Date of Patent: May 20, 2008

(54) OPTICAL PLUGGABLE TRANSCEIVER WITH SECURABLE LATCHING MECHANISM

(75) Inventors: Kazushige Oki, Kanagawa (JP); Hiromi Kurashima, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/797,742

(22) Filed: May 7, 2007

(51) Int. Cl.
*G02B 6/36* (2006.01)
(52) U.S. Cl. .............................. 385/89; 385/88; 385/92
(58) Field of Classification Search ................... 385/49, 385/88–94
See application file for complete search history.

(56) References Cited

U.S. PATENT DOCUMENTS

| | | | |
|---|---|---|---|
| 6,883,971 B2 * | 4/2005 | Chiu et al. ..................... 385/53 |
| 6,935,882 B2 | 8/2005 | Hanley et al. | |
| 7,048,452 B2 | 5/2006 | Malagrino, Jr. | |
| 2004/0228582 A1 * | 11/2004 | Yamada et al. ................ 385/81 |
| 2005/0281514 A1 | 12/2005 | Oki et al. | |
| 2005/0286837 A1 | 12/2005 | Oki et al. | |
| 2005/0286838 A1 | 12/2005 | Oki et al. | |
| 2006/0140552 A1 * | 6/2006 | Mizue et al. ................. 385/92 |
| 2007/0212000 A1 * | 9/2007 | Yoshikawa .................... 385/88 |

OTHER PUBLICATIONS

X2MSA "A Cooperation Agreement for a Small Versatile 10 Gigabit Trasceiver Package", Issue 1.0b, Feb. 28, 2003, pp. 1-28.

* cited by examiner

*Primary Examiner*—Hemang Sanghavi
(74) *Attorney, Agent, or Firm*—Venable LLP; Michael A. Sartori

(57) ABSTRACT

A pluggable optical transceiver is disclosed in which, even an irregular operation is carried out, the engagement between the transceiver and the rail may be secured. The optical transceiver, which is pluggable with the rail provided in the host system, includes a grip assembled with the receptacle, a latch lever to be engaged with the rail, a leaf spring that pushes the latch lever outward and an actuator to make a seesaw motion to rotate the latch lever synchronizing with the slide of the grip. Because the center of the rotation center of the latch lever positions inward with respect to the end of the latch lever, the engagement of the latch lever with the rail may be further secured even the irregular operating is applied in the latch lever.

13 Claims, 5 Drawing Sheets

OPTICAL PLUGGABLE TRANSCEIVER WITH SECURABLE LATCHING MECHANISM

CROSS-REFERENCE TO RELATED APPLICATIONS

This application contains subject matter which relates to a subject matter contained in applications, Ser. number of which is Ser. No. 11/115,388, filed on Apr. 27, 2005, published as US20050286837A, entitled by "Pluggable optical transceiver having shielding structure", which claims a benefit of provisional applications No. 60/566,075 field on Apr. 29, 2004 and No. 60/632,194 filed on Dec. 2, 2004, which is assigned to the same assignee as the present application and is hereby incorporated herein by reference in its entirety.

BACKGROUND OF THE INVENTION

1. Field of the Invention

The present invention relates to an optical transceiver, in particular, the invention relates to a mechanism of a pluggable optical transceiver to engage or disengage with rail of the host system.

2. Related Prior Art

A pluggable optical transceiver in one aspect thereof is used to be installed in a host system such as computer or optical HUB system, while according to another aspect, the pluggable transceiver receives an optical connector in an optical receptacle installed in the transceiver to optically couple the optical fiber in the connector with an optical device in the receptacle.

Such optical transceiver is set on the host system by, for example, engaging the latch lever provided in the sides of the transceiver with the keyhole formed in the rail on the host system. To engage or disengage the latch lever with the keyhole may insert the transceiver in the host system or release it from the system.

A conventional transceiver provides a latching mechanism shown in FIGS. 4A and 4B, which has been disclosed in the United States patent application published as US20050286837A, to engage with and to release from the rail provided on the host system. FIGS. 4A and 4B omit the upper housing to explain the latching mechanism in the lower housing and only show the optical receptacle portion of the transceiver.

FIG. 4A shows a condition in a case that the optical transceiver 100 is set in the host system, where an end 101c of the actuator 101 engages with the keyhole 2a of the rail 2. The optical receptacle 16 of the transceiver 100 provides a grip 10, which surrounds the receptacle 16, to manipulate the grip 16 for releasing the engagement between the actuator 101 and the keyhole 2a. Pulling the grip 10 frontward, to the left side in FIG. 4A, the end 101c of the actuator 101 slides up the slope 10b to push the end 101c of the actuator 101 outward. Because the actuator 101 performs the seesaw motion by the pivot 101b as a center, the other end 101a of the actuator 101 may be pulled within the transceiver 100, which is shown in FIG. 4B.

Thus, the engagement between the end 101a of the actuator 101 and the keyhole 2a of the rail may be released and the transceiver 100 becomes free from the rail 2. Sliding the transceiver 100 on the rail 2 frontward after releasing the engagement between the end 101c and the keyhole 2a, which also disengages the electrical plug provided in the rear end of the transceiver 100 with the electrical connector on the host system, the transceiver 100 may be extracted from the host system.

An elastic member 102 such as leaf spring always applies an outward force to the other end 101a of the actuator 101, which not only pushes the other end 101c outward but also pulls the end 101c of the actuator inward. As a result, the end 101c of the actuator 101 is automatically set in the bottom of the slope 10b, that is, the transceiver 100 sets the grip 10 closest to the body of the transceiver 100 in a state free from the rail 2, which is the neutral position of the grip 10.

When an irregular external force F4 is applied to the transceiver 100, where the transceiver 100 in the end 101a of the actuator 101 engages with the rail 2, to extract from the rail 2 without manipulating the grip 10, the tip end 101a of the actuator 101 receives a moment F6 due to the reaction force F5, which operates so as to release the engagement with the rail 2 as shown in FIG. 5. This situation may appear when the rail 2 is relatively thick, that is, in a case the tip end of the actuator 101 abuts against the wall surface of the rail 2, not hooked by the rail in the case the rail is formed by a metal plate.

SUMMARY OF THE INVENTION

The present invention is to provide an optical transceiver that provides a new latching mechanism, where the engagement of the latch lever with the rail is hard to be released even by a irregular operation mentioned above. An optical transceiver according to the present invention is a type of a pluggable transceiver that is plugged in a rail provided in the host system. The rail forms a keyhole with which the transceiver is engaged.

The transceiver comprises a grip, an actuator, a latch lever, and an elastic member. The grip is attached to an optical receptacle so as to surround the optical receptacle. The grip slides along a longitudinal axis of the optical transceiver. The actuator has a pivot and a pair of arms. Arms, each has an end, extend from the pivot to directions opposite to each other. The latch lever provides a rotation center and a latching end to be engaged with the keyhole of the rail. The latching end abuts against one end of the arms of the actuator. The elastic member pushes the latch end of the latch lever outward. In the latching mechanism recited above, the latching end positions forward with respect to the rotation center of the latch lever.

Because the latching mechanism of the present invention is thus configured, the transceiver may be prevented from irregularly releasing from the rail even when an external force is applied to the transceiver without manipulating the grip. The latching end preferably positions outward with respect to the rotation center of the latch lever, which enhances the engagement of the latch lever with the keyhole of the rail.

The latch lever of the present invention may be branched in an end thereof so as to form a stopper branch and a working branch. The stopper branch may engage with the keyhole of the rail, while, the working branch, by coming in contact with one end of the actuator, may rotate the latch lever.

The grip may provide a slope where the other end of the actuator slides on. Pulling the grip frontward, one end of the actuator runs on the slop to push the end outward, which induces the seesaw motion around the pivot and the other end of the actuator may be pulled inward, which releases the engagement of the latch lever with the keyhole of the rail. Moreover, because the elastic member always pushes the latch lever outward, the force due to the elastic member induces the counter seesaw motion in the actuator to bring the end thereof inward, that is, the end of the actuator slides off the slop and the grip automatically positions closest to the optical receptacle.

DESCRIPTION OF PREFERRED EMBODIMENTS

Figure 1:
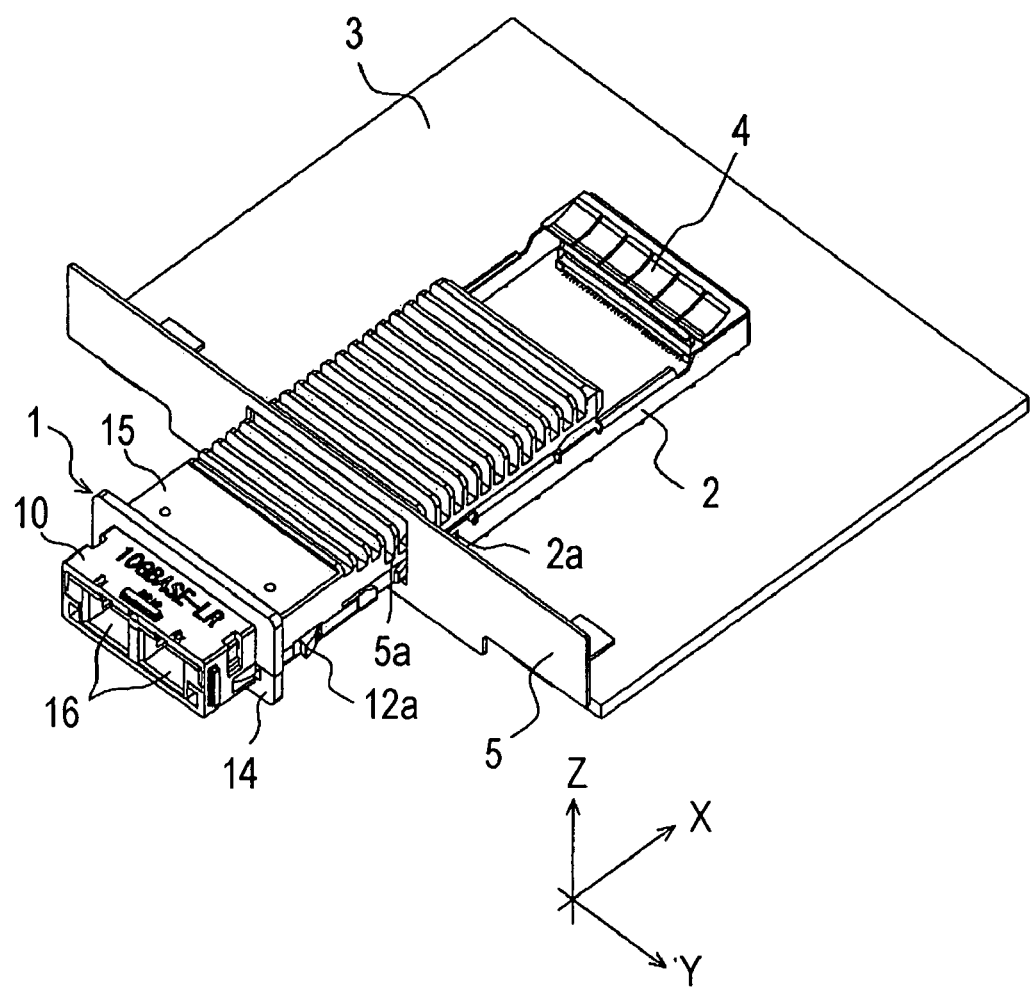
FIG. 1 is a perspective view showing an optical transceiver plugged within a rail on the host board.

FIG. 1 is a perspective view showing a pluggable optical transceiver according to an embodiment of the present invention, where the optical transceiver is mounted on the host board 3 by engaging with the rail 2. The transceiver 1 includes an upper housing 15 and the lower housing 14, which forms an optical receptacle 16 in a front side to be engaged with the optical connector. In the description, the front side corresponds to a side where the transceiver provides the optical receptacle 16 and the rear side is opposite thereto.

The host board 3 that mounts the transceiver 1 provides a face panel 5 with an opening 5a thorough which the transceiver 1 is inserted. A pair of rails 2 on the host board 5 extends from the opening 5a. The transceiver 1, inserting the rear side thereof into the opening 5a, engages with the rail. The rear end of the rail 2 provides an electrical connector 4 that mates with the transceiver 1.

The transceiver 1 provides a mechanism to engage with the rail 2. That is, the transceiver 1 includes a latch lever 12 in a side thereof, while the rail 2 provides a keyhole 2a to be engaged with the latch lever 12. The transceiver 1 may be engaged with or disengaged from the rail 2 by mating the latch lever 12 with the keyhole 2a or releasing the latch lever 12 from the keyhole 2a. The transceiver 1 further includes a grip 10 in the front end thereof to release the engagement between the latch lever 12 and the keyhole 2a.

Figure 2A:
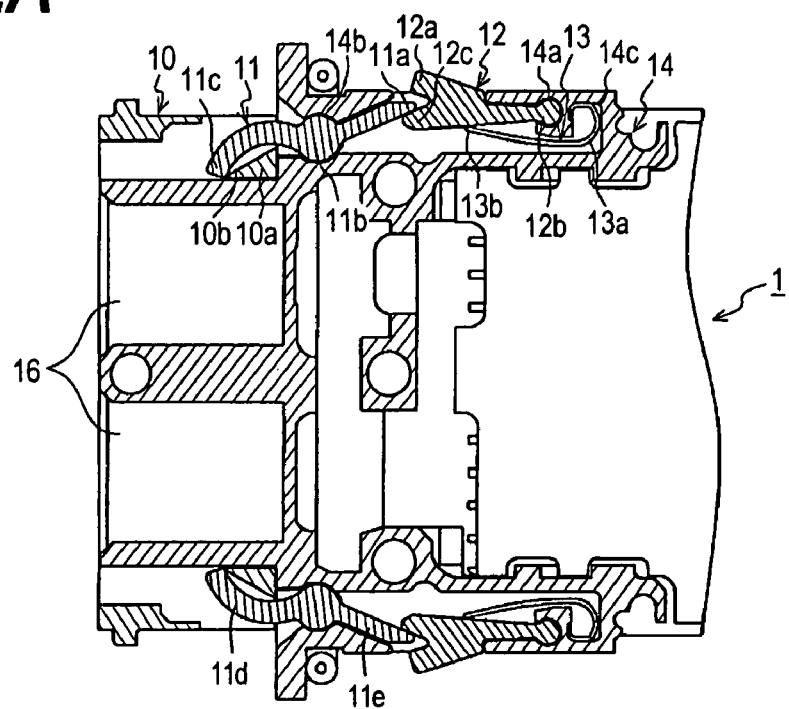
FIG. 2A is a sectional view showing the latching mechanism according to an embodiment of the present invention.
Figure 2B:
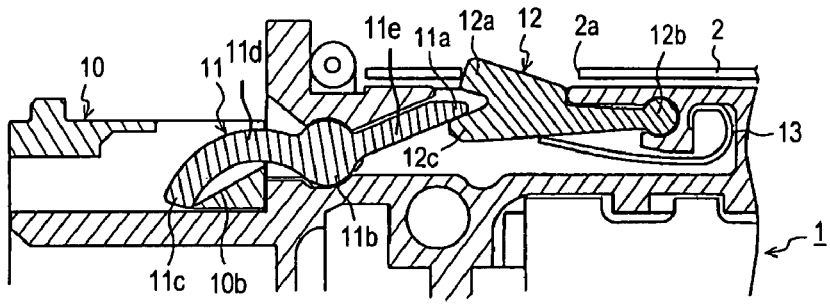
FIG. 2B shows the latching mechanism when the grip is in the initial position.
Figure 2C:
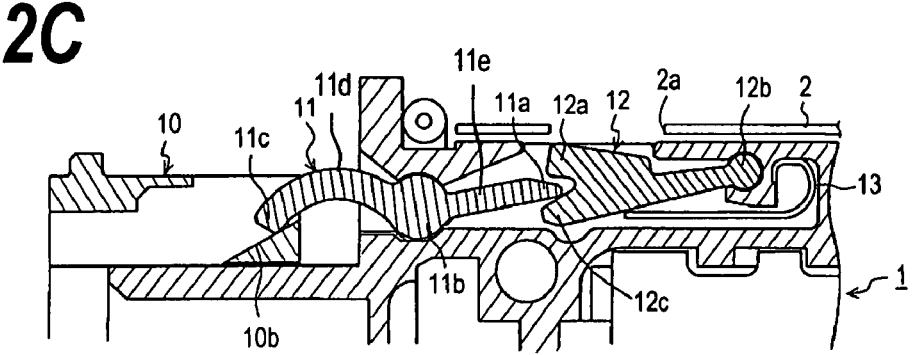
FIG. 2C shows the latching mechanism when the grip is pulled frontward.

Next will describe a mechanism to engage with or to release from the rail 2. FIG. 2A magnifies a front portion of the optical transceiver 1 by removing the upper housing, FIG. 2B shows a state when the transceiver 1 engages with the rail 2, while FIG. 2C shows a state when the engagement is released.

The latching mechanism of the transceiver 1 according to the present embodiment includes a grip 10, a latch lever 12, an elastic member 13 and an actuator 11. The lower housing 14 installs these members, 11 to 13.

The grip 10 is assembled in the front end of the transceiver 1 so as to surround the optical receptacle 16 and to be movable along a longitudinal direction of the transceiver 1, along which the transceiver 1 is inserted into or released from the rail 2. The latch lever 12 engages with, in an end portion thereof, the keyhole 2a of the rail 2 when the transceiver 1 is inserted therein. The elastic member 13, which is a type of leaf spring, pushes out the latch lever 12 outward. The actuator 11 causes a seesaw motion synchronized with the slide of the grip 10 along the longitudinal direction of the transceiver 1. This seesaw motion of the actuator 11 rotates the latch lever 12 resistive to the force due to the elastic member 13 and releases the engagement between the end of the latch lever 12 and the keyhole 2a of the rail 2.

Next will explain in detail the respective members used in the latching or releasing mechanism. The latch lever 12 provides a rotation center 12b in one end thereof. The first shell 14a of the lower housing 14 receives this rotation center 12b of the latch lever 12 so as to enable the rotation of the latch lever 12 around the rotation center 12b. The other end of the latch lever 12 has a forked shape, one branch 12a of which is called as a stopper branch and engages with the keyhole 2c of the rail 2, while, the other 12c of which is called as a working branch and abuts against the actuator 11. Further, as shown in FIG. 2B, the rotation center 12b of the latch lever 12 positions in a rear side of the transceiver 1 with respect to a point where the stopper branch 12a engages with the keyhole 2a of the rail 2.

The actuator 11 provides a pivot 11b for the seesaw motion in a center thereof and a pair of arms, 11d and 11c, each extending opposite directions from the pivot. The second shell 14b of the lower housing 14 receives this pivot 11b so as to enable the seesaw motion of the actuator 11. Further, one end 11a of the arm 11c is put between the branches, 12a and 12c, of the latch lever 12 and comes in contact with working branches 12c. The other end 11c of the arm 11d comes in contact with the slope 10b of the grip 10 and slide on and off the slope 10b.

The grip 10 provides the slope 10b to induce the seesaw motion in the actuator 11. The grip 10 that surrounds the optical receptacle 16 provides the slope 10b whose angle is in parallel to a longitudinal direction to slide the grip 10, that is, the slope 10b increases the height thereof toward the rear side of the transceiver 1, namely, toward the pivot 11b of the actuator 11. The end 11c of the actuator comes in contact with this slope 10b. Because the arm 11d has an arched shape, the angle between the slop 10b and the end 11c becomes moderate.

The elastic member 13 pushes the working branch 12c outward. The third shell 14c of the lower housing 14 receives one end 13a of the elastic member 13 so as to push the latch lever 12 outward. The latch lever 12, the actuator 14 and the elastic member 13 may be provided in both sides of the transceiver 1.

The latching/releasing mechanism according to the present embodiment of the invention operates as follows. To slide the grip 10 back and forth brings the end 11c of the actuator 11 to run up or go down the slope 10b of the grip 10, which induces the seesaw motion of the actuator 11. The other end 11a of the actuator 11 comes in contact with the working branch 12c of the latch lever 12 due to this seesaw motion to pull the latch lever 12 inward to release the engagement between the keyhole 2a of the rail 2 and the stopper branch 12a.

The motion of the actuator 11 and that of the latch lever 12 will be explained more specifically as referring to FIGS.

2B and 2C. When the transceiver 1 is set within the host system, that is, the transceiver 1 engages with the rail 2 as shown in FIG. 2B, the leaf spring 13 pushes the latch lever 12 outward such that the stopper branch 12a protrudes from the lower housing 1 to engage with the keyhole 2a of the rail 2.

To slide the grip 10 from the position closest to the optical receptacle, which is shown in FIG. 2B, to a position shown in FIG. 2C may extract the transceiver 1 from the rail 2. Pulling the grip forward, the end 11c of the actuator 11 runs up the slope 10b to induce the seesaw motion in the actuator 11 around the pivot 11b, which pulls the other end 11a of the actuator inward.

Because the other end 11a of the actuator 11 is put between the branches, 12a and 12c, of the latch lever 12, the other end 11a comes in contact with the working branch 12c, more specifically, the outer surface of the working branch 12c, which pulls the latch lever 12 inward to release the engagement between the keyhole 2a of the rail 2 and the stopper branch 12a.

When the transceiver 1 is free from the host system, the force due to the leaf spring 13 so as to push the latch lever 12 outward operates the actuator 11 to rotate it counter clock wise until the end 11a of the actuator 11 comes in contact with the lower housing 14, which makes the other end 11c of the actuator 11 slid down the slope 10b and the grip 10 positioned in the closest to the lower housing 10.

Figure 3A:
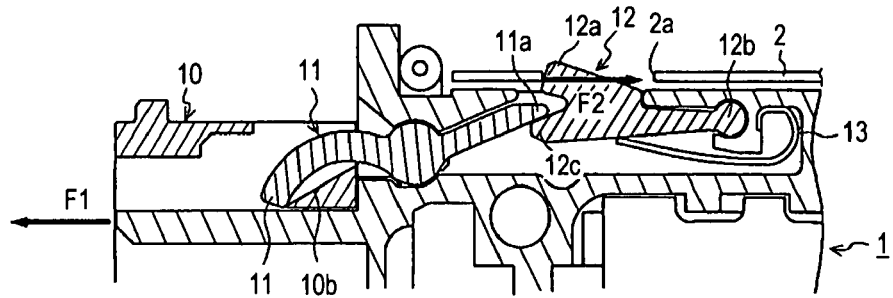
FIG. 3A illustrates the latching mechanism when an irregular force is applied to the transceiver to extract from the rail, FIG. 3B explains the latching mechanism based on the vector analysis of the force applied to the mechanism
Figure 3B:
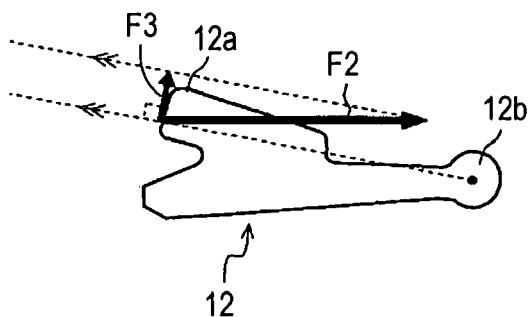
FIG. 3C illustrates the latching mechanism when the rail has a thick wall.
Figure 3C:
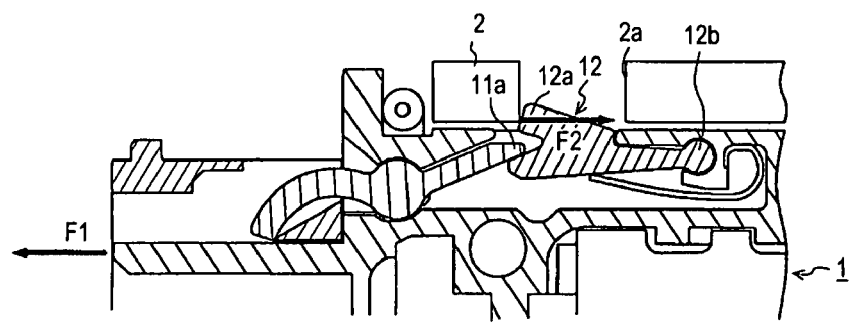
Figure 4A:
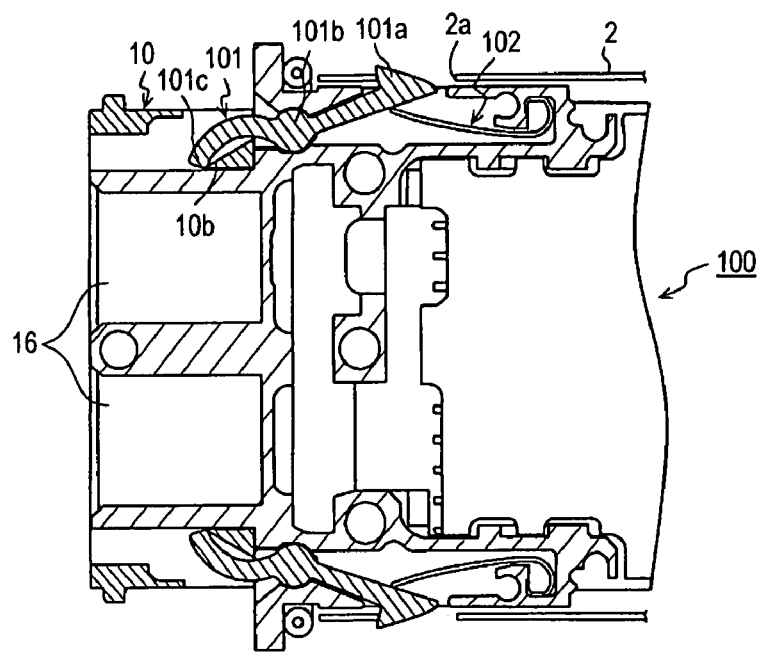
FIG. 4A illustrates the conventional latching mechanism when the grip is in the initial position.
Figure 4B:
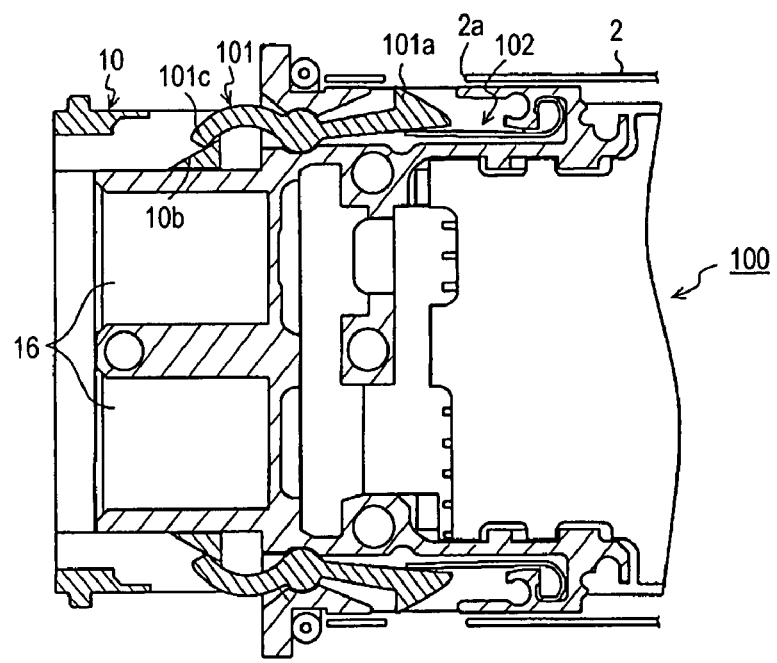
FIG. 4B illustrates the mechanism when the grip is pulled frontward.
Figure 5:
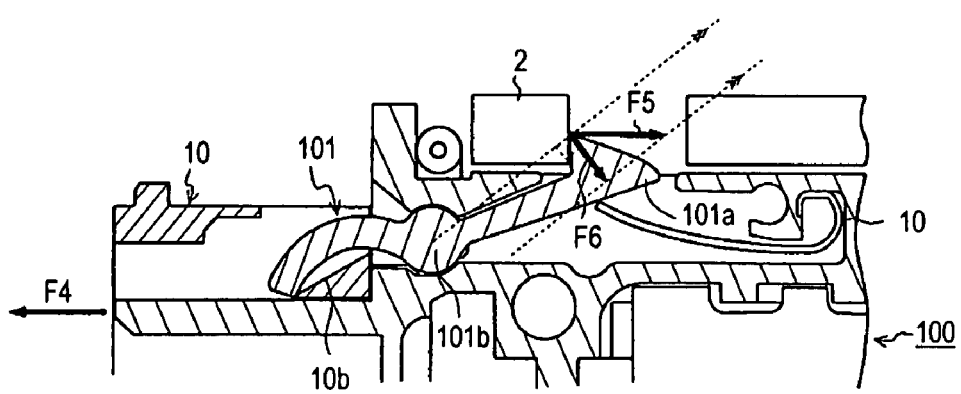
FIG. 5 shows the vector analysis of the forces applied when the irregular operation is carried out in the mechanism.

Next, a case when the transceiver 1 is irregularly operated such that the transceiver 1 is forced to release from the rail 2 as referring to FIGS. 3A to 3C. FIGS. 3A and 3C a plan view that illustrates a case when the transceiver 1 receives an irregularly force to release from the rail 2, and FIG. 3B schematically explains the force vector applied to the latch lever 12.

When the transceiver 1 receives a force F1 to release from the rail 2 without manipulating the grip 10, the rail 2 applies a counter force F2 to the latch lever 12 in the stopper branch 12a. The force F2 has the same magnitude as the force F1 but the direction thereof is opposite, namely, to the rear side of the transceiver 1. However, the rotation center 12b of the latch lever 12 positions inside of the transceiver with respect to the point where the rail 2 abuts against the stopper branch 12a of the latch lever 12. Thus, even the force F2 is induced in the stopper branch 12a against the rail 2, the force F2 induces the moment F3 so as to push the stopper branch 12a of the latch lever 12 outward, which further rigidly engages the transceiver 1 with the rail 2 to prevent the transceiver 1 from extracting from the rail 2.

This mechanism may be independent of the thickness of the rail 2. As shown in FIG. 3C, when the thickness of the rail 2 is so thick and the transceiver 1 is forced to release from the rail 2 without manipulating the grip 10, the counter force F2 applied to the stopper branch 12a of the latch lever 12 may be equivalent when the thickness of the rail 2 is thin.

What is claimed is:

1. An optical transceiver plugged in a host system with a rail that provides a keyhole to be engaged with the optical transceiver, comprising:
   a grip attached to an optical receptacle of the optical transceiver so as to surround the optical receptacle, the grip sliding along a longitudinal axis of the optical transceiver;
   an actuator with a pivot and a pair of arms each having an end and extending from the pivot to a direction opposite to each other;
   a latch lever with a rotation center and a latching end to be engaged with the keyhole of the rail in the host system, the latching end abutting against one end of the arms of the actuator; and
   an elastic member for pushing the latching end of the latch lever outward,
   wherein the latching end positions forward with respect to the rotation center of the latch lever.

2. The optical transceiver according to claim 1, wherein the latching end positions outward with respect to the rotation center of the latch lever.

3. The optical transceiver according to claim 2, wherein the latching end of the latch lever is branched to form a stopper branch and a working branch, the stopper branch being engaged with the keyhole of the rail and positioning forward and outward with respect to the rotation center of the latch lever.

4. The optical transceiver according to claim 3, wherein the one end of the arms of the actuator is put between the stopper branch and the working branch and in contact with the working branch.

5. The optical transceiver according to claim 1, wherein the grip provides a slope where one end of the arms of the actuator runs on synchronizing with the slide of the grip to induce a seesaw motion around the pivot in the actuator.

6. The optical transceiver according to claim 5, wherein the latching end of the latch lever is branched to form a stopper branch and a working branch, the other end of the actuator being put between the stopper branch and the working branch so as to come in contact with the working branch, and
   wherein the seesaw motion of the actuator pushes the working branch inward by the other end of the actuator to release the engagement of the stopper branch with the keyhole of the rail.

7. The optical transceiver according to claim 1, wherein one of arms extending forward opposite to a side where the latch lever is provided has an arched shape.

8. The optical transceiver according to claim 7, wherein a force caused by the elastic member to push the latch lever outward automatically sets the grip in a position closes to the optical receptacle through a moment to rotate the actuator.

9. An optical transceiver plugged in a host system with a rail that provides a keyhole to be engaged with the optical transceiver, comprising:
   a grip attached to an optical receptacle of the optical transceiver so as to surround the optical receptacle, the grip sliding along a longitudinal axis of the optical transceiver;
   an actuator with a pivot and a pair of arms each having an end and extending from the pivot to a direction opposite to each other;
   a latch lever with a rotation center and a latching end to be engaged with the keyhole of the rail in the host system, the latching end coming in contact with one end of the arms of the actuator; and
   an elastic member for pushing the latching end of the latch lever outward,
   wherein the latching end positions outward with respect to the center of the latch lever.

10. The optical transceiver according to claim 9, wherein the grip provides a slope where one end of the arms of the actuator runs on synchronizing with the slide of the grip to induce a seesaw motion around the pivot in the actuator.

11. The optical transceiver according to claim 10,
wherein the latching end of the latch lever is branched to form a stopper branch and a working branch, the other end of the actuator being put between the stopper branch and the working branch so as to come in contact with the working branch, and
wherein the seesaw motion of the actuator pushes the working branch inward by the other end of the actuator to release the engagement of the stopper branch with the keyhole of the rail.

12. The optical transceiver according to claim 9,
wherein one of arms extending forward opposite to a side where the latch lever is provided has an arched shape.

13. The optical transceiver according to claim 12,
wherein a force caused by the elastic member to push the latch lever outward automatically sets the grip in a position closes to the optical receptacle through a moment to rotate the actuator.

* * * * *